US012801594B2

(12) United States Patent
Harris

(10) Patent No.: US 12,801,594 B2
(45) Date of Patent: Nov. 17, 2026

(54) ARTIFICIAL INTELLIGENCE ASSISTANCE FOR PROVIDING CLIENT SUPPORT BASED ON MESSAGING PLATFORM COMMUNICATIONS

(71) Applicant: Truist Bank, Charlotte, NC (US)

(72) Inventor: Shawn N. Harris, Cookeville, TN (US)

(73) Assignee: TRUIST BANK, Charlotte, NC (US)

(*) Notice: Subject to any disclaimer, the term of this patent is extended or adjusted under 35 U.S.C. 154(b) by 196 days.

(21) Appl. No.: 18/678,210

(22) Filed: May 30, 2024

(65) Prior Publication Data

US 2025/0370994 A1 Dec. 4, 2025

Related U.S. Application Data

(63) Continuation of application No. 18/678,009, filed on May 30, 2024, now abandoned.

(51) Int. Cl.

| | |
|---|---|
| ***G06F 16/242*** | (2019.01) |
| ***G06F 16/248*** | (2019.01) |
| ***G06F 16/3329*** | (2025.01) |
| ***G06F 16/338*** | (2019.01) |
| ***G06N 20/00*** | (2019.01) |
| ***G06Q 30/015*** | (2023.01) |

(52) U.S. Cl.

CPC .......... *G06F 16/243* (2019.01); *G06F 16/248* (2019.01); *G06F 16/3329* (2019.01); *G06F 16/338* (2019.01); *G06N 20/00* (2019.01); *G06Q 30/015* (2023.01)

(58) Field of Classification Search

CPC .... G06F 16/00; G06F 16/243; G06F 16/3329; G06F 16/338; G06F 16/248; G06N 20/00; G06Q 30/00; G06Q 30/015

See application file for complete search history.

(56) References Cited

U.S. PATENT DOCUMENTS

| | | | | |
|---|---|---|---|---|
| 11,418,652 | B1 * | 8/2022 | Tron | G06N 20/00 |
| 11,706,337 | B1 * | 7/2023 | Mitchem | G06F 40/30 704/270.1 |
| 2020/0234694 | A1 * | 7/2020 | Griffiths | G10L 15/144 |
| 2022/0070296 | A1 * | 3/2022 | Friio | H04L 51/02 |
| 2022/0156298 | A1 * | 5/2022 | Mahmoud | G06F 16/9535 |
| 2024/0177172 | A1 * | 5/2024 | Ghoche | G06Q 30/015 |
| 2024/0283868 | A1 * | 8/2024 | Ferris | H04M 3/362 |

* cited by examiner

*Primary Examiner* — Sean E Serraguard

(74) *Attorney, Agent, or Firm* — Nicholas Martin; Greenberg Traurig, LLP; Michael A. Springs

(57) ABSTRACT

Artificial intelligence trained with messaging communications can be used to provide support for software services. In an example, a computing system can receive, via a graphical user interface (GUI), a first query associated with a first request from a client with respect to an issue with a service. The first query can be provided in a natural language format to a machine learning model that is trained on historical communication logs from a messaging platform. The machine learning model can generate a first output indicating a first answer to the first query. The machine learning model can also generate a second output indicating a second query associated with a second answer provided as a second input. The first answer and the second query can be presented in the natural language format on the user device via the GUI for use in resolving the issue with the service.

19 Claims, 5 Drawing Sheets

ARTIFICIAL INTELLIGENCE ASSISTANCE FOR PROVIDING CLIENT SUPPORT BASED ON MESSAGING PLATFORM COMMUNICATIONS

CROSS-REFERENCE TO RELATED APPLICATIONS

This application is a continuation of U.S. patent application Ser. No. 18/678,009, filed May 30, 2024, entitled "ARTIFICIAL INTELLIGENCE ASSISTANCE FOR PROVIDING CLIENT SUPPORT BASED ON MESSAGING PLATFORM COMMUNICATIONS", the entirety of which is incorporated herein by reference.

TECHNICAL FIELD

The present disclosure relates generally to artificial intelligence and, more particularly (although not necessarily exclusively), artificial intelligence assistance for providing client support based on messaging platform communications.

BACKGROUND

Users may commonly experience issues with software services and may contact support agents for aid in resolving the issues. Support agents may access resources such as policy databases to locate relevant information to assist users. Service providers with complex services may have relatively large numbers of support agents accessing such resources. It may be beneficial for support agents to quickly locate accurate information to use in resolving user issues.

DETAILED DESCRIPTION

Figure 1:
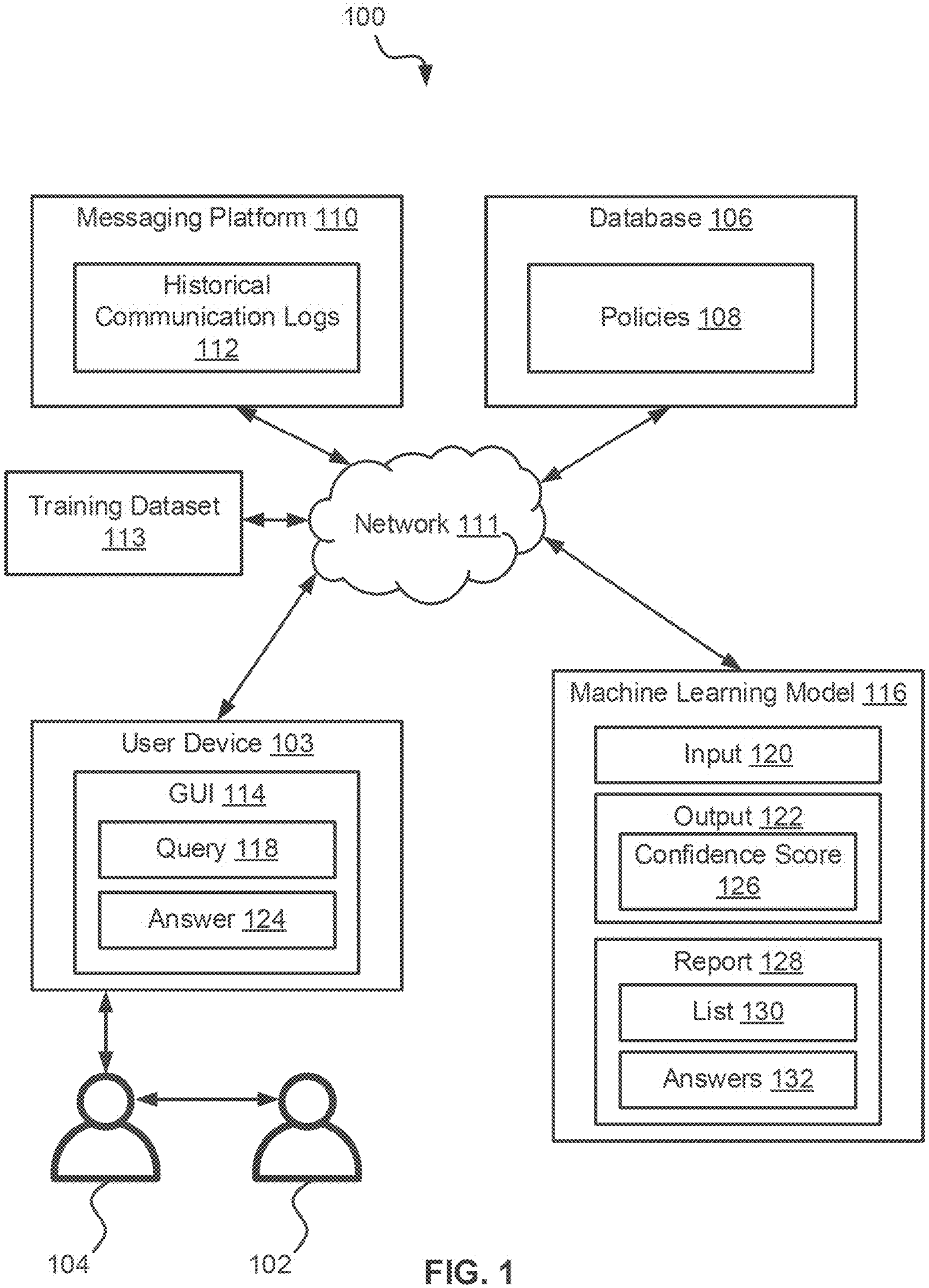
FIG. 1 is a block diagram of an example of a system for using artificial intelligence to provide client support, according to some aspects of the present disclosure.

Certain aspects and examples of the present disclosure relate to using artificial intelligence to aid customer support agents. The artificial intelligence system can be trained using historical communications on a messaging platform. In a conventional scenario, a team of support agents may communicate with one another using a messaging platform, in which agents may engage in textual conversations via chat messages. A support agent, who may be on the phone with a client, may ask a question to the other support agents via the messaging platform regarding the client's issue. Another support agent that has experience with the issue may provide the answer. But, this is a slow and tedious process that requires a support agent with experience in the issue to be signed on and available to answer the question. If an agent needs to know the answer to the same question again in the future, they may need to ask other agents again via the messaging platform or attempt to search the chat logs for previous answers, but these kinds of chat logs are generally not well indexed and hard to search.

Some examples described herein can aid support agents by providing a machine learning model that can help answer these questions quickly and efficiently. The machine learning model can be trained on the historical chat logs from the messaging platform. The support agent can enter a question associated with the client's issue into a graphical user interface. Using the historical communication on the messaging platform, the machine learning model can generate an answer to the question for the support agent in real time and with a high degree of accuracy, regardless of whether other support agents are available. The machine learning model may also be trained to generate an output that includes a query, based on an answer provided as input. The generated query can be an example of a question that a client may ask to a support agent that may result in the inputted answer. Queries for commonly answered topics can be used in simulated training environments for support agents. For example, the machine learning model may generate practice queries for a particular topic or issue for which a support agent is being trained to assist.

Using conventional approaches, it can be challenging to quickly resolve client issues within the time span of a single phone call or online chat. Support agents may have access to chat logs or databases that outline support policies, but for complex issues or services it may be difficult or impossible to quickly locate a relevant policy using keyword searches. In some cases, a question for the same type of issue may have been asked multiple times in the messaging platform but may not be easily identified or documented in policy databases, thus wasting computing resources with repeat searches that may yield irrelevant or inaccurate results. Having to attempt unsuccessful searches repeatedly and manually can be a slow and tedious process that can consume excessive amounts of computing resources, such as network bandwidth, cache memory, and RAM. It may be particularly beneficial for service providers with large numbers of support agents to reduce the amount of time and computing resources required to access relevant support information and to provide relevant training to support agents.

Some examples described herein can address one or more of the abovementioned problems using a machine learning model trained on historical communications from a messaging platform. The machine learning model may quickly (e.g., within seconds) generate answers to queries. Often, the machine learning model may generate an answer in less time than a support agent would take to search related keywords to locate information. Reducing the number of manual searches performed by support agents can reduce resource consumption and latency on the support side, particularly for systems with large numbers of support agents. Using the machine learning model can also reduce time needed to resolve software issues or other issues on the client side.

The machine learning model may also be used to train support agents to quickly locate information and reduce the number of manual searches performed. For example, the machine learning model may also be trained to generate queries based on inputted answers. The generated queries may be queries that are likely to result in the inputted answer if the generated queries were provided as input to the machine learning model. The generated queries can be used to train a support agent on the types of questions or issues that may be posed by a client in an actual support environment. In some examples, the queries can be generated to provide supplemental training to a support agent that has had difficulty in providing support for a particular service, issue, topic, etc. The support agent can be trained on practice queries generated by the machine learning model that target the support agent's specific weaknesses.

In some examples, the machine learning model can be improved over time with additional training. For example, the support agent may provide feedback (e.g., a rating) via the graphical user interface indicating the usefulness of the answer or the query generated by the machine learning model. The machine learning model can be trained using the feedback or any other metrics (e.g., length of time that the support agent was communicating with the client after the answer was provided or the number of follow-up queries submitted after the answer was provided) to improve the accuracy of generated answers or queries. For example, highly rated answers or answers associated with less follow-up queries may be more likely to be provided for similar queries after the training. The machine learning model can therefore continually adapt to provide faster and more accurate information to the support agent.

The machine learning model may also generate additional information for the support agent. For example, the machine learning model may generate a confidence score indicating a confidence in the relevance or accuracy of the answer. In some examples, the confidence score may be based on how similar the submitted query is to a similar query in the chat log, the number of similar queries identified in the chat log, etc. A report can be generated (e.g., daily or weekly) of the most frequently submitted queries and their associated answers. The report may be automatically distributed to some or all support agents. Tracking the most frequently submitted queries can enable subject matter experts to generate relevant policies or articles in support databases. In some examples, the machine learning model may additionally be trained with data from such support databases.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a system 100 for using artificial intelligence to provide client support, according to some aspects of the present disclosure. The system 100 may provide services (e.g., wire-transfer services, access to user accounts, applications, or any other type of software service) to clients 102. A client 102 may experience an issue with a service provided by the system 100. Examples of issues can include login issues, account issues, issues with using an application, or any suitable service issue. To resolve the issue, the client 102 may contact a support agent 104 to resolve the issue. For example, the client 102 may call into a help hotline to speak with the support agent 104.

The support agent 104 may have access to various resources to provide support to the client 102. For example, the support agent 104 have access to a user device 103, which may include a laptop computer, desktop computer, tablet, e-reader, smart watch, smart phone, etc. The support agent 104 can use the user device 103 to access a database 106 storing policies 108, such as procedures for providing support, guides, frequently asked questions (FAQs) and answers, fact sheet resources, and/or other information indicating how to resolve various issues or identifying resources (e.g., forms, documents, webpages) that can be accessed to resolve various issues. But it can be slow, difficult, and tedious to try to search and sort through all of this information to find the relevant information to resolve a client's issue. For example, it may be difficult for the support agent 104 to locate a relevant policy 108 in the database 106, or the database 106 may not have a relevant policy 108. To expedite the process, the support agent 104 may contact other support agents in an internal messaging platform 110 to ask questions. Other support agents may try to help answer the question, but in some cases they may not know the answer, may give an incorrect answer, or may not provide the answer in a timely manner (e.g., while the support agent 104 is in contact with the client 102). Over time, the messaging platform 110 may have logs of historical communications 112 between support agents asking and answering support questions. In some examples, the historical communication logs 112 may be searchable, but it may be difficult for the support agent 104 to quickly locate relevant information using keyword searches. For example, some messaging platforms may not have comprehensive search engines, or the information needed by the support agent 104 may be too complex to identify via keyword searches.

Some examples of the present disclosure can help simplify the search process by providing a machine learning model 116 that can be accessed via a graphical user interface 114 provided by the user device 103. The machine learning model 116 can perform natural language processing (NLP). NLP is a subfield of machine learning and computer science that involves an interaction between computers and humans using human languages. An objective of NLP can be to extract meaning and understanding from content of human communication in text and speech. NLP can be used to automate a process based on what a person says. The system 100 can train the machine learning model 116 based on the historical communication logs 112, which store chats between support agents on the messaging platform 110. In some examples the system 100 can also train the machine learning model 116 using any other suitable content, including policies 108 in the database 106. The machine learning model 116 can use a training dataset 113 during a training process to learn how to interpret natural language inputs and provide natural language responses to engage in a conversation with the support agent 104. The machine learning model 116 may be any suitable type of NLP model. For example, the machine learning model 116 may be a neural network, such as a generative pre-trained transformer (GPT) model.

To access the machine learning model 116, the support agent 104 may pose a query 118 requesting information to the graphical user interface 114. The query 118 may be posed in a natural language format (e.g., as if the support agent 104 were speaking with another human). This query 118 can be provided as input 120 to the machine learning model 116, such as via a network 111 (e.g., the Internet, a personal area network, a local area network (LAN), a wide area network (WAN), or a wireless local area network (WLAN)). The system 100 can execute the machine learning model 116 to generate an output 122 based on the input 120. The output 122 can include an answer 124 to the query 118, which can be provided to the support agent 104 via the graphical user interface 114.

In some examples, the machine learning model 116 may also be used in simulated training environments for support agents. For example, the machine learning model 116 may be trained to generate an output 122 that includes a practice query 118. The output 122 can be generated by the machine learning model 116 based on an input 120, which can include an answer 124. The practice query 118 can be provided to a support agent 104 in training as an example of an issue that may arise in a client phone call. The input 120 can be a topic or a type of issue that the practice query 118 can address. Because the machine learning model 116 is trained with a large training dataset 113 of previous questions and associated answers, the generated queries 118 may be helpful in exposing support agents to service issues that are likely to arise in support environments. This can expose support agents to a variety of service issues and enable the support agents in quickly resolving software issues without requiring repeated manual searching. In some examples, the machine learning model 116 can be used to provide specialized training to support agents based on their performance in resolving issues.

For example, the system 100 may track the amount of time that a support agent 104 takes to resolve an issue or a type of issue. The system 100 may also track other metrics, such as the number of queries 118 that the support agent 104 provides as input 120 to the machine learning model 116 for a particular type of issue. These metrics can be used to determine if the support agent 104 needs additional training for certain issues. If the support agent 104 has historically (e.g., on average) taken an amount of time or submitted an average number of queries to the machine learning model 116 that exceeds a predetermined threshold for a particular type of issue, the system 100 may flag the support agent 104 as requiring training for that type of issue. The system 100 or the support agent 104 may then provide a request for a practice query related to the issue into the machine learning model 116. For example, the input 120 can be an answer 124 and a request for a query 118 that may result in the answer 124. In other examples, the input 120 can be a topic or an issue and a request for a query 118 that relates to the topic or issue. The practice queries 118 can be used to simulate a support environment for the support agent 104 and can provide examples of productive questions for the support agent 104 to input into the machine learning model 116.

In some examples, the queries 118 generated in response to inputted answers 124 can be used in training the machine learning model 116. For example, a query 118 generated in response to an inputted answer 124 can be provided again as input 120 to the machine learning model 116 to test the accuracy of the machine learning model 116. If the generated query 118 provided as input 120 causes the machine learning model 116 to generate an additional output 122 that differs significantly from the original answer 124 provided to the machine learning model 116, the original answer 124 and generate query 118 may be penalized in subsequent training of the machine learning model 116.

Figure 2:
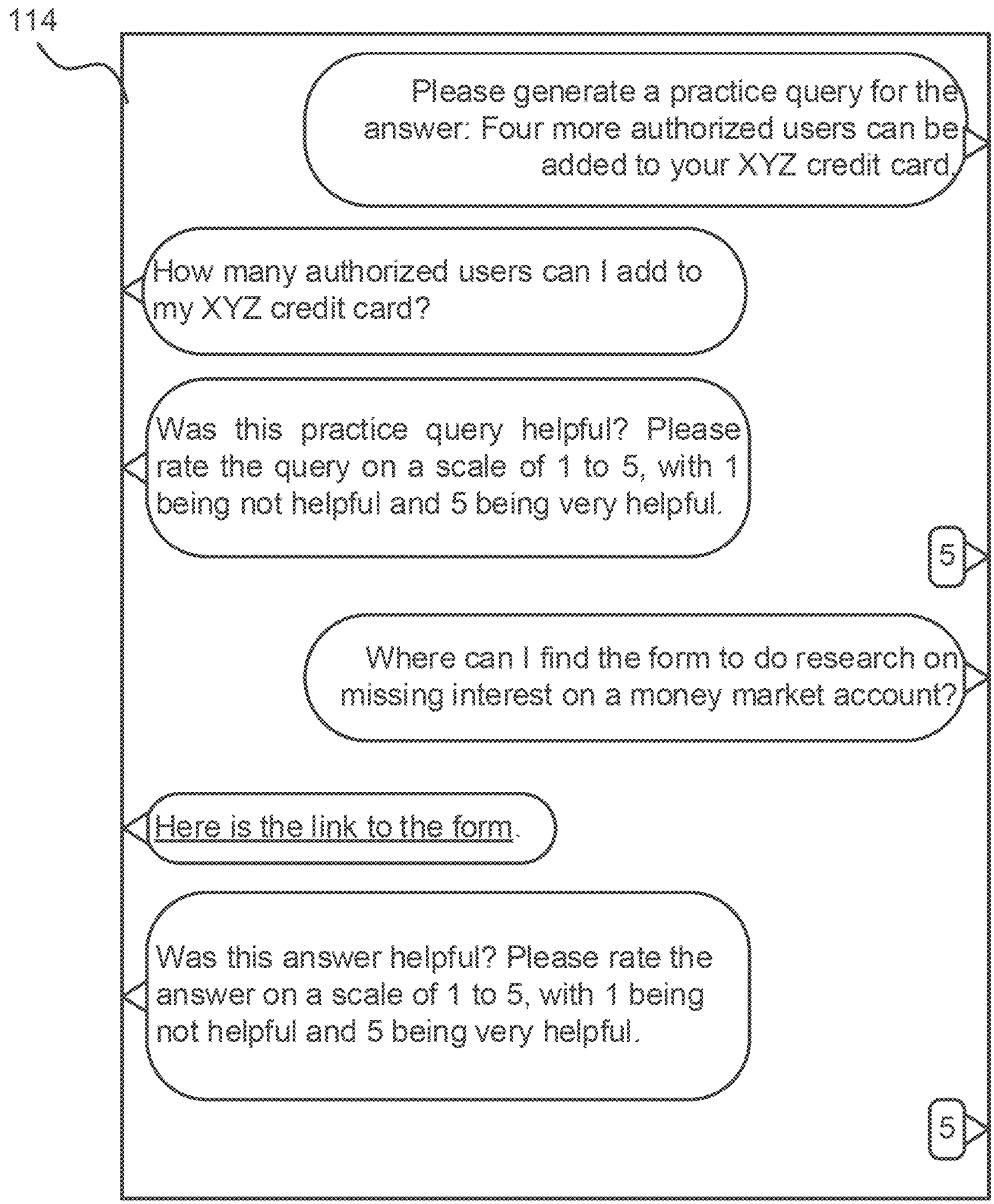
FIG. 2 is a diagram of an example of a graphical user interface providing client support via artificial intelligence, according to some aspects of the present disclosure.

Examples of queries and answers in the graphical user interface 114 are depicted in FIG. 2, with inputs from the support agent 104 depicted on the right side of the graphical user interface 114 and outputs from the machine learning model 116 depicted on the left side of the graphical user interface 114. In this example, the support agent 104 may first ask the machine learning model 116 to generate a practice query for an inputted answer. The machine learning model 116 may use training data of historical queries and associated answers to generate a practice query in a natural language format. The practice query can be answered with the answer inputted by the support agent 104. In some examples, the support agent 104 may instead ask the machine learning model 116 to generate a practice query for a particular topic. The practice query can have an answer that is associated with the requested topic. For example, the practice query may be similar to questions that have commonly been provided as input to the machine learning model 116 for that topic, or to communication between support agents in a messaging platform.

Additionally, the support agent 104 may be assisting the client 102 issues or questions related to financial services provided by the system 100, but support for any type of service may be provided. The answers generated by the machine learning model 116 can be provided in a natural language format that is easily understandable by the support agent 104. In some examples, the answer can be hyperlinked (e.g., to a webpage, form, etc.) with additional support for the support agent 104.

In some examples, the machine learning model 116 may tailor the output 122 to a specific support agent 104 (e.g., based on prompt engineering). For example, the input 120 may include information about the support agent 104, such as an identifier associated with a support level assigned to the support agent 104. Some support agents with relatively more experience or training may have a higher support level than a relatively inexperienced support agent. The machine learning model 116 may be trained to generate the output 122 that is tailored to the support level. For example, an output 122 for a relatively lower support level can include a query 118 or answer 124 that includes more definitions of terms, longer explanations, or simpler words compared to an output 122 generated for a relatively higher support level.

In some examples, the support agent 104 may provide feedback that can be used to improve the machine learning model 116. For example, the graphical user interface 114 may prompt the support agent 104 to rate the helpfulness of an answer. The numerical rating may be used in additional training of the machine learning model 116. Other metrics may also be used to further train the machine learning model 116, such as the number of follow up questions in response to an answer to a query, the length of time that the support agent 104 was on a call or chat with the client 102 after the answer was generated, or the like. Similarly, the support agent 104 may rate the accuracy of a query 118 generated for an inputted answer 124.

Returning now to FIG. 1, in some examples the output 122 generated by the machine learning model 116 may additionally include a confidence score 126 associated with the answer 124. The confidence score 126 can be a probability of relevance or accuracy for the output 122. For example, an answer to a question with a relatively high similarity to another answered question in the messaging platform 110, a previously generated answer that was highly rated, or an answer that has been provided multiple times in the messaging platform may have a relatively high confidence score. A low confidence score may be generated for an answer that has only had a few associated queries and answers in the historical communication logs 112, conflicting historical answers, etc. In some examples, the machine learning model 116 may generate additional details with respect to the answer 124 to provide to the support agent 104. For example, the output 122 may include a number of times that similar queries 118 have been submitted, an average rating for the provided answer 124, or any other information about the answer 124.

The system 100 (e.g., the machine learning model 116 or another computerized tool) may periodically generate a report 128 with a list 130 of the most commonly queried questions over a prior time window, such as the last week, month, etc. The report 128 may be distributed to support agents via user devices. The list 130 of most commonly queried questions may be accompanied by answers 132 to the associated queries. This can reduce latency and resource consumption for the system 100 by reducing duplicate queries by different support agents. Further, subject matter experts can generate new policies 108 for the database 106 to answer commonly queried questions. Such policies 108 can be designated as verified answers for questions, and in some examples the machine learning model 116 can be trained to prioritize verified answers when generating the answer 124. This can further improve the accuracy of answers generated by the machine learning model 116.

Although FIG. 1 depicts a certain number and arrangement of components, this is for illustrative purposes and is intended to be non-limiting. Other examples may include more components, fewer components, different components, or a different arrangement of the components shown in FIG. 1.

Figure 3:
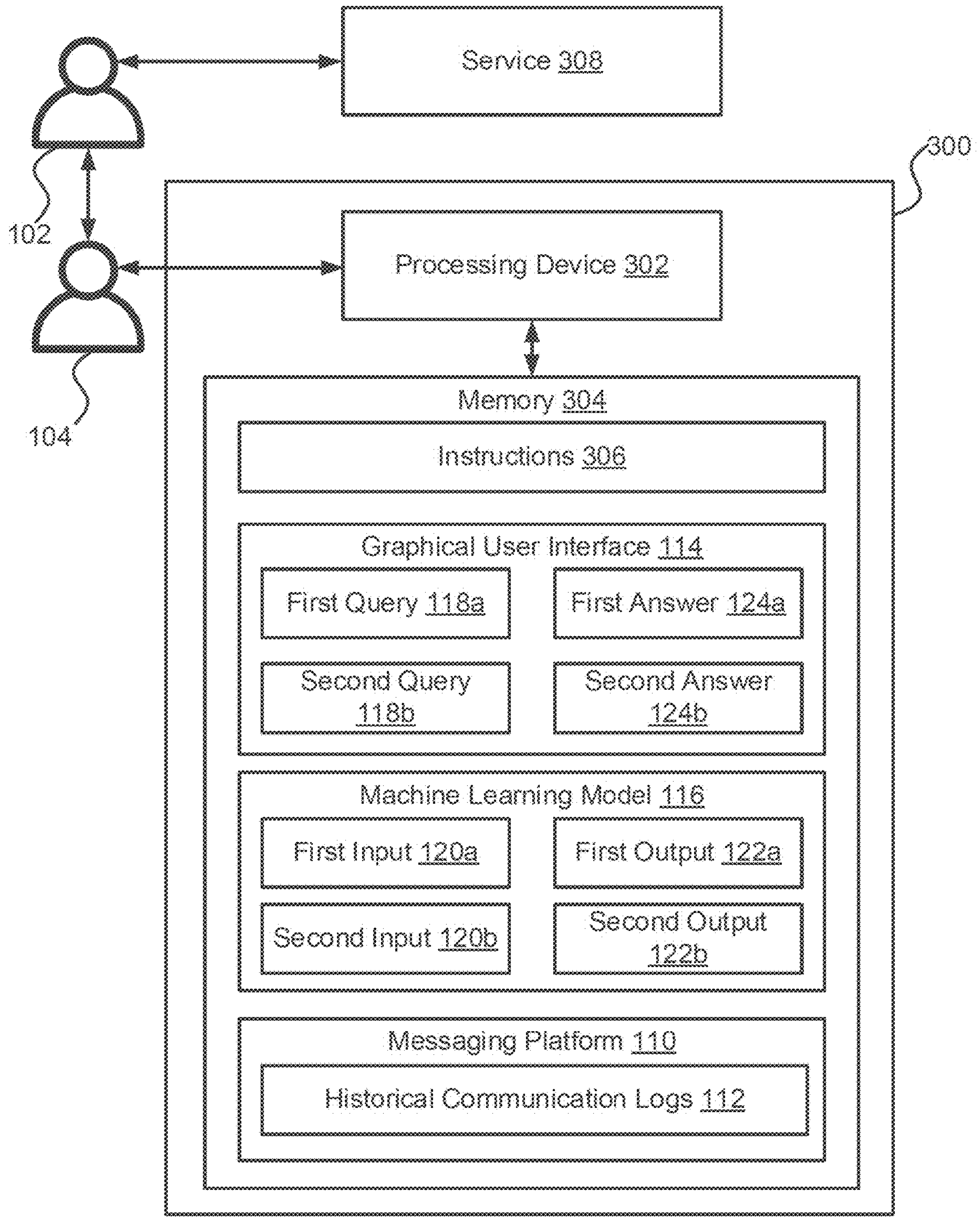
FIG. 3 is a block diagram of another example of a system for using artificial intelligence to provide client support, according to some aspects of the present disclosure.

FIG. 3 is a block diagram of another example of a system for using artificial intelligence to provide client support, according to some aspects of the present disclosure. The system includes a computer system 300. The computer system 300 includes a processing device 302 that is communicatively coupled to a memory 204. In some examples, the processing device 302 and the memory 304 may be distributed from (e.g., remote to) one another.

The processing device 302 can include one processing device or multiple processing devices. Non-limiting examples of the processing device 302 include a Field-Programmable Gate Array (FPGA), an application-specific integrated circuit (ASIC), and a microprocessor. The processing device 302 can execute instructions 306 stored in the memory 304 to perform operations. In some examples, the instructions 306 can include processor-specific instructions generated by a compiler or an interpreter from code written in a suitable computer-programming language, such as C, C++, C#, etc.

The memory 304 can include one memory or multiple memories. The memory 304 can be non-volatile and may include any type of memory that retains stored information when powered off. Non-limiting examples of the memory 304 include electrically erasable and programmable read-only memory (EEPROM), flash memory, or any other type of non-volatile memory. At least some of the memory 304 can include a non-transitory, computer-readable medium from which the processing device 302 can read instructions 306. A computer-readable medium can include electronic, optical, magnetic, or other storage devices capable of providing the processing device 302 with computer-readable instructions or other program codes. Non-limiting examples of a computer-readable medium include magnetic disk(s), memory chip(s), ROM, random-access memory (RAM), an ASIC, a configured processor, optical storage, or any other medium from which a computer processor can read the instructions 306.

The memory 304 can include instructions for generating a graphical user interface 114, which a support agent 104 (e.g., a human support agent) can interact with to receive support information. The support agent 104 may be in communication with a client 102 (e.g., a human client) that is experiencing an issue or requires assistance with a service 308 associated with the computer system 300. The memory 304 can also include instructions 306 that are executable by the processing device 302 to present the graphical user interface 114. The support agent 104 can input a first query 118*a* associated with the issue with the service 308 via the graphical user interface 114. The memory 304 can also include a machine learning model 116, which can be trained using training data that includes historical communication logs 112 from a messaging platform 110, FAQs, blog posts, websites, books, articles, support documents, and/or other material. The machine learning model 116 can receive the first query 118*a* as first input 120*a* and can generate a first output 122*a* indicating a first answer 124*a* to the first query 118*a* based on the first input 120*a*. The first input 120*a* and the first answer 124*a* can be in a natural language format. The machine learning model 116 can also receive a second answer 124*b* as second input 120*b* and can generate a second output 122*b* indicating a second query 118*b* associated with the second answer 124*b* based on the second input 120*b*. The second input 120*b* and the second query 118*b* can be in the natural language format. The graphical user interface 114 can present the first answer 124*a* and the second query 118*b* to the support agent 104 for use in resolving the issue with the service 308.

Figure 4:
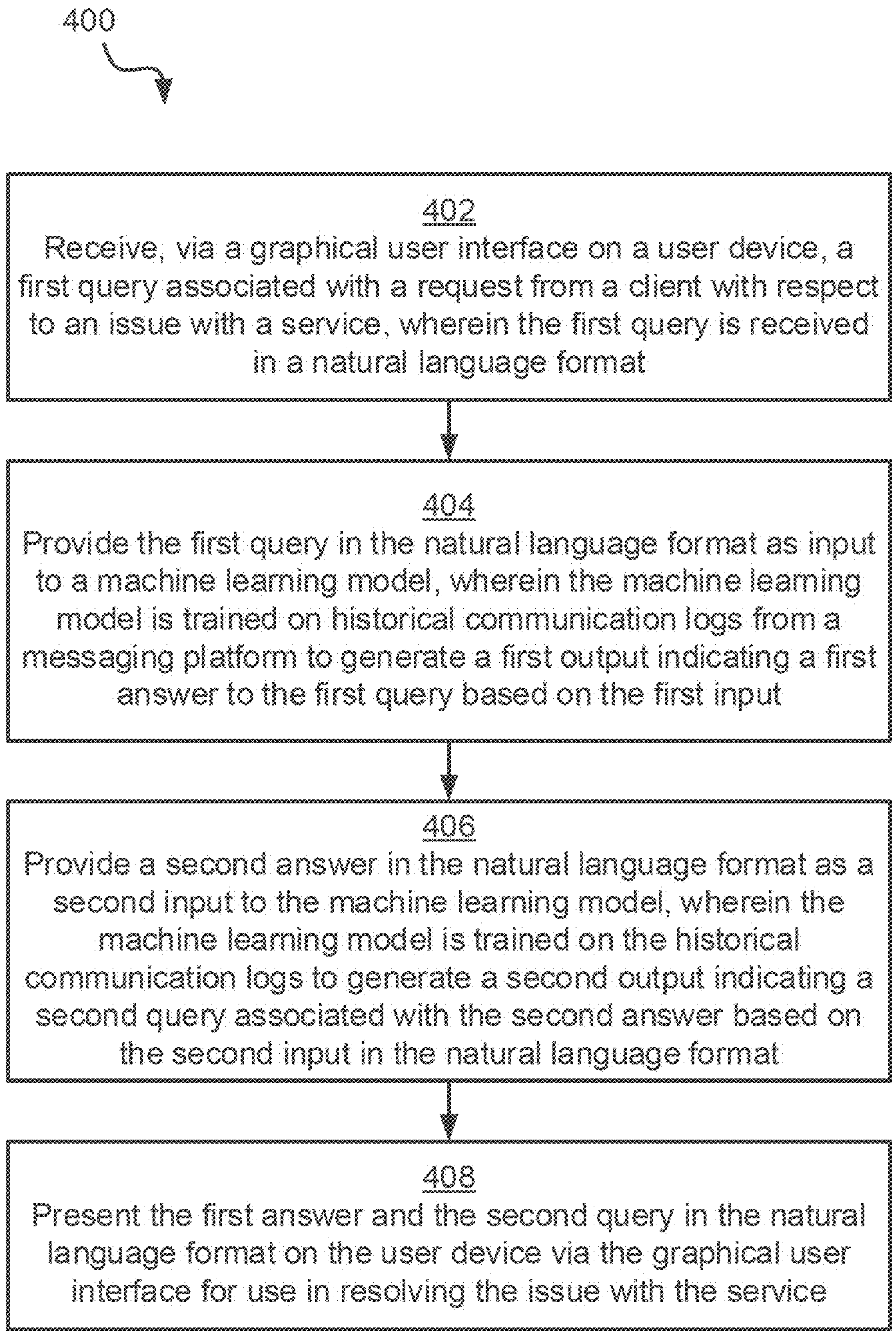
FIG. 4 is a flow chart of an example of a process for using artificial intelligence to provide client support, according to some aspects of the present disclosure.

Turning now to FIG. 4, shown is a flow chart of an example of a process 400 for using artificial intelligence to provide client support, according to some aspects of the present disclosure. Other examples can involve more operations, fewer operations, different operations, or a different order of operations shown in the figures. The operations of FIG. 4 will now be described below with reference to the components described above in FIGS. 1-3. Some or all of the steps of the process 400 can be performed by the processing device 302.

At block 402, processing device 302 receives, via a graphical user interface 114 on a user device 103, a first query 118*a* associated with a request from a client 102 with respect to an issue with a service 308. For example, the client 102 may be requesting assistance with filling out an application for the service, accessing a user account, switching services, etc. A support agent 104 assisting the client 102 may enter a first query 118*a* requesting information about the issue into the graphical user interface 114. The first query 118*a* can be entered in a natural language format. For example, the first query 118*a* may be "How can I add another authorized user to my account?"

At block 404, processing device 302 provides the first query 118*a* in the natural language format as a first input 120*a* to a machine learning model 116. The machine learning model 116 may be trained on historical communication logs 112 from a messaging platform 110, and/or other data sources, to generate an output 122. The output 122 can indicate a first answer 124*a* to the first query 118*a*, where the first answer 124*a* is determined based on the first input 120*a*. The historical communication logs 112 may include queries presented by support agents and answers provided by other support agents. The historical communication logs 112 may include communications that occurred over the course of months or years. It may be likely that a similar query has previously been asked in the messaging platform 110. In some examples, the machine learning model 116 may also be trained using policies 108, FAQs, blog posts or articles, and/or other materials from support databases 106. For example, commonly asked queries may have verified answers that are heavily weighted in training for the machine learning model 116. This can increase accuracy for the answers generated by the machine learning model 116.

The machine learning model 116 can generate the first output 122*a* indicating the first answer 124*a* to the first query 118*a* in the natural language format. For example, the first answer 124*a* to the question "How can I add another authorized user to my account?" may be the phrase "Here is a link to fill out a form to add another authorized user to your account." The first answer 124*a* may be hyperlinked to the webpage for the form.

At block 406, the processing device 302 provides a second answer 124*b* in the natural language format as a second input 120*b* to the machine learning model 116. The machine learning model 116 may also be trained on the historical communication logs 112 to generate a second output 122*b* indicating a second query 118*b* associated with the second answer 124*b* based on the second input 120*b* provided in the natural language format. The second query 118*b* can be used to train the support agent 104 on the types of questions that may arise in a support environment, or to provide additional training on issues for which the support agent 104 may be struggling to aid.

For example, the processing device 302 may determine that additional training for the support agent 104 may be beneficial based on collected metrics, such as the amount of time that the support agent 104 spends resolving certain issues or the number of follow-up queries provided to the machine learning model 116. For example, the support agent 104 may typically input a large number of queries to the machine learning model 116 for a particular type of issue. This may indicate that the support agent 104 may not be providing relevant information in the inputted queries or may be providing queries in an effective format (e.g., that does not result in generating answers that are relevant to resolving the issue). Thus, the machine learning model 116 can be used to generate a second query 118*b* based on the second input 120*b* of the second answer 124*b*, which may be associated with the issue. The support agent 104 can use the second query 118*b* in a training environment in which the support agent 104 can practice addressing issues associated with the second query 118*b*.

In some examples, the first output 122*a* or the second output 122*b* may include additional information related to the first answer 124*a* or the second query 118*b*. This can include a confidence score 126 indicating a degree of confidence in the accuracy or relevancy of the output. Higher confidence scores can be associated with more accurate outputs. The processing device 302 can present the confidence score 126 with the first answer 124*a* or the second query 118*b* on the graphical user interface 114 of the user device 103. The confidence score 126 can aid the support agent 104 in determining whether to continue searching for an answer. For example, if the confidence score is relatively low, the support agent 104 may input follow-up queries 118 into the graphical user interface 114 to receive additional information. Other information may also be generated by the machine learning model 116, such as a number of times that the query has been provided to the machine learning model 116. Queries that have been answered multiple times may be more accurate than queries that have only been asked a few times.

At block 408, the processing device 302 presents the first answer 124*a* and the second query 118*b* in the natural language format on the user device 103 via the graphical user interface 114 for use in resolving the issue with the service 308. Additional information such as the confidence score 126 may also be presented via the graphical user interface 114. The support agent 104 may use the hyperlink for the first answer 124*a* to access the webpage needed to address the issue for the client 102. In some examples, the support agent 104 may submit follow-up queries or provide feedback on the answer 124 generated by the machine learning model 116. This feedback can be used in additional training of the machine learning model 116.

Figure 5:
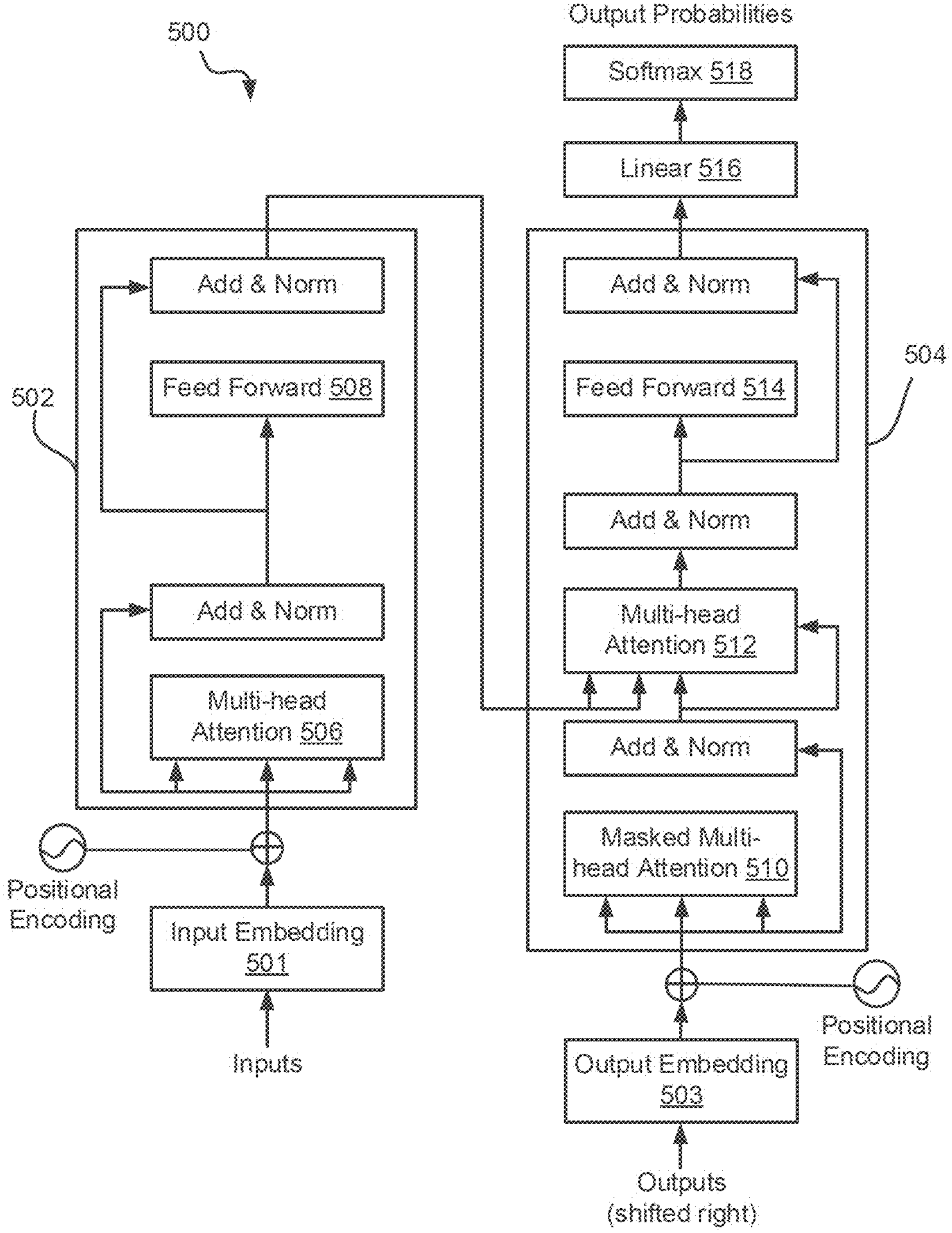
FIG. 5 is a block diagram of an example of a machine learning model for providing client support, according to some aspects of the present disclosure.

FIG. 5 is a block diagram of an example of a machine learning model 500 for providing client support, according to some aspects of the present disclosure. The machine learning model 500 can be an example of the machine learning model 116 of FIGS. 1 and 3. The machine learning model 500 can be a deep learning model with a transformer architecture. For example, the machine learning model 500 can use an encoder-decoder structure. An encoder 502 can map inputs (e.g., natural language inputs) to a series of continuous representations. A decoder 504 can use output received from the encoder 502, as well as output received from the decoder 504 at a previous time step, to generate an output sequence.

To start, in a first time step, input embeddings 501 can be generated from a natural language input (e.g., a query or an answer). Positional information of the words in the input can be preserved via positional encoding (e.g., by injecting a vector into the input embeddings 501 that adds the relative positions of each word). The input embedding 501 can be fed to a multi-head attention layer 506 in the encoder 502. Outputs from the multi-head attention layer 506 can be fed to a feed forward network layer 508, which can generate output vectors for the encoder 502 that are fed to the decoder 504.

The decoder 504 can have a masked multi-head attention layer 510 that receives the output vectors of the previous iteration from the decoder 504, a multi-head attention layer 512 that receives the output vectors from the encoder 502 and the masked multi-head attention layer 510, and a feed forward network 514. The output of the decoder 504 at each time step can be fed back into the decoder 504 in the next time step. Similar to the inputs for the encoder 502, the outputs (shifted right) that are fed to the decoder 504 can be embedded to generate output embeddings 503 with positional encoding. The output embeddings with the positional encoding can be fed into the masked multi-head attention layer 510. The masked multi-head attention layer 510 can mask words that occur after a given word for each time step. The output from the encoder 502 and the output from the masked multi-head attention layer 510 can be fed into the multi-head attention layer 512. Output from the multi-head attention layer 512 can be fed into a feed forward network 514. In a next time step, output from the feed forward network 514 can be fed into the masked multi-head attention layer 510 (e.g., as an output embedding 503 with positional encoding).

Once the feed forward network 514 generates an output of a vector of floats, a linear layer 516 (e.g., a neural network) can generate a logits vector based on the output from the feed forward network 514. The logits vector can include scores corresponding to a unique word. A softmax layer 518 can use the logits vector to generate probabilities based on the scores. The word corresponding to the highest probability can be chosen as the output for the current time step. This process can repeat with subsequent time steps to generate an answer or a query.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:

a processing device; and a non-transitory memory including instructions that are executable by the processing device for causing the processing device to:

receive, via a graphical user interface on a user device, a request from a customer support agent, wherein the request is for a practice query for a simulated training environment, wherein the request is received in a natural language format and includes an answer to the practice query, and wherein the practice query is associated with an issue with a service;

provide the request in the natural language format as a first input to a machine learning model, wherein the machine learning model is trained on historical communication logs from a messaging platform to generate a first output indicating the practice query associated with the answer based on the first input in the natural language format, wherein the machine learning model is configured to provide a confidence score as part of the first output, the confidence score indicating a likelihood of relevance or accuracy of the first output, wherein the machine learning model is further configured to tailor the first output to a support level identified in the first input, wherein tailoring the first output to the support level involves adjusting terminology and a level of detail in the first output based on the identified support level, and wherein the support level is associated with the customer support agent, wherein the historical communication logs include internal chat logs using the messaging platform, the internal chat logs include an internal text chat discussion between a first support agent and a second support agent to assist the first support agent in providing real-time assistance to a client during an ongoing conversation with the client; and transmit the practice query in the natural language format to the user device for presentation to the customer support agent via the graphical user interface for use in resolving the issue with the service in the simulated training environment.

2. The system of claim 1, wherein the practice query is a first query, the issue is a first issue, and wherein the memory further includes instructions that are executable by the processing device for causing the processing device to:

receive, via the graphical user interface on the user device, a second query associated with another request with respect to a second issue with the service, wherein the second query is received in the natural language format;

provide the second query in the natural language format as a second input to the machine learning model, wherein the machine learning model is trained on the historical communication logs from the messaging platform to generate a second output indicating a second answer to the second query based on the second input in the natural language format; and present the second answer in the natural language format on the user device via the graphical user interface for use in resolving the second issue with the service.

3. The system of claim 2, wherein the memory further includes instructions that are executable by the processing device for causing the processing device to:

provide a third answer in the natural language format as a third input to the machine learning model, wherein the machine learning model is trained on the historical communication logs to generate a third output indicating a third query associated with the third answer based on the third input in the natural language format; and present the third query in the natural language format on the user device via the graphical user interface for use in resolving the second issue with the service.

4. The system of claim 3, wherein the memory further includes instructions that are executable by the processing device for causing the processing device to:

prompt, via the graphical user interface, a user to input a rating for the second answer to the second query or for the third query associated with the third answer;

receive, via the graphical user interface, the rating for the second answer to the second query or for the third query associated with the third answer; and train the machine learning model using the rating by weighting the second answer or the third query in a training dataset based on the rating.

5. The system of claim 2, wherein the memory further includes instructions that are executable by the processing device for causing the processing device to:

determine an amount of time involved in resolving the second issue; and train the machine learning model using the second answer to the second query and the amount of time involved in resolving the second issue.

6. The system of claim 2, wherein the machine learning model is further configured to generate a confidence score for the second answer, and wherein the memory further includes instructions that are executable by the processing device for causing the processing device to present the confidence score for the second answer on the user device via the graphical user interface.

7. The system of claim 2, wherein the second output generated by the machine learning model further comprises a number of times that the second query was previously input to the machine learning model.

8. A method comprising:

receiving, by a processing device and via a graphical user interface on a user device, a request from a customer support agent, wherein the request is for a practice query for a simulated training environment, wherein the request is received in a natural language format and includes an answer to the practice query, and wherein the practice query is associated with an issue with a service;

providing, by the processing device, the request in the natural language format as a first input to a machine learning model, wherein the machine learning model is trained on historical communication logs from a messaging platform to generate a first output indicating the practice query associated with the answer based on the first input in the natural language format, wherein the machine learning model is configured to provide a confidence score as part of the first output, the confidence score indicating a likelihood of relevance or accuracy of the first output, wherein the machine learning model is further configured to tailor the first output to a support level identified in the first input, wherein tailoring the first output to the support level involves adjusting terminology and a level of detail in the first output based on the identified support level, and wherein the support level is associated with the customer support agent, wherein the historical communication logs include internal chat logs using the messaging platform, the internal chat logs include an internal text chat discussion between a first support agent and a second support agent to assist the first support agent in providing real-time assistance to a client during an ongoing conversation with the client; and transmitting, by the processing device, the practice query in the natural language format to the user device for presentation to the customer support agent via the graphical user interface for use in resolving the issue with the service in the simulated training environment.

9. The method of claim 8, wherein the practice query is a first query, the issue is a first issue, and wherein the method further comprises:

receiving, via the graphical user interface on the user device, a second query associated with another request with respect to second issue with the service, wherein the second query is received in the natural language format;

providing the second query in the natural language format as a second input to the machine learning model, wherein the machine learning model is trained on the historical communication logs from the messaging platform to generate a second output indicating a second answer to the second query based on the second input in the natural language format; and presenting the second answer in the natural language format on the user device via the graphical user interface for use in resolving the second issue with the service.

10. The method of claim 9, further comprising:

providing a third answer in the natural language format as a third input to the machine learning model, wherein the machine learning model is trained on the historical communication logs to generate a third output indicating a third query associated with the third answer based on the third input in the natural language format; and presenting the third query in the natural language format on the user device via the graphical user interface for use in resolving the second issue with the service.

11. The method of claim 10, further comprising:

prompting, via the graphical user interface, a user to input a rating for the second answer to the second query or for the third query associated with the third answer;

receiving, via the graphical user interface, the rating for the second answer to the second query or for the third query associated with the third answer; and training the machine learning model using the rating by weighting the second answer or the third query in a training dataset based on the rating.

12. The method of claim 9, further comprising:

determining an amount of time involved in resolving the second issue; and training the machine learning model using the second answer to the second query and the amount of time involved in resolving the second issue.

13. The method of claim 9, wherein the machine learning model is further configured to generate a confidence score for the second answer, and wherein the method further comprises presenting the confidence score for the second answer on the user device via the graphical user interface.

14. The method of claim 9, wherein the second output generated by the machine learning model further comprises a number of times that the second query was previously input to the machine learning model.

15. A non-transitory computer-readable medium comprising program code that is executable by a processing device for causing the processing device to:

receive, via a graphical user interface on a user device, a request from a customer support agent, wherein the request is for a practice query for a simulated training environment, wherein the request is received in a natural language format and includes an answer to the practice query, and wherein the practice query is associated with an issue with a service;

provide the request in the natural language format as a first input to a machine learning model, wherein the machine learning model is trained on historical communication logs from a messaging platform to generate a first output indicating the practice query associated with the answer based on the first input in the natural language format, wherein the machine learning model is configured to provide a confidence score as part of the first output, the confidence score indicating a likelihood of relevance or accuracy of the first output, wherein the machine learning model is further configured to tailor the first output to a support level identified in the first input, wherein tailoring the first output to the support level involves adjusting terminology and a level of detail in the first output based on the identified support level, and wherein the support level is associated with the customer support agent, wherein the historical communication logs include internal chat logs using the messaging platform, the internal chat logs include an internal text chat discussion between a first support agent and a second support agent to assist the first support agent in providing real-time assistance to a client during an ongoing conversation with the client; and transmit the practice query in the natural language format to the user device for presentation to the customer support agent via the graphical user interface for use in resolving the issue with the service in the simulated training environment.

16. The non-transitory computer-readable medium of claim 15, wherein the practice query is a first query, the issue is a first issue, and wherein the non-transitory computer-readable medium further comprises program code that is executable by the processing device for causing the processing device to:

receive, via the graphical user interface on the user device, a second query associated with another request with respect to second issue with the service, wherein the second query is received in the natural language format;

provide the second query in the natural language format as a second input to the machine learning model, wherein the machine learning model is trained on the historical communication logs from the messaging platform to generate a second output indicating a second answer to the second query based on the second input in the natural language format; and present the second answer in the natural language format on the user device via the graphical user interface for use in resolving the second issue with the service.

17. The non-transitory computer-readable medium of claim 16, further comprising program code that is executable by the processing device for causing the processing device to:

provide a third answer in the natural language format as a third input to the machine learning model, wherein the machine learning model is trained on the historical communication logs to generate a third output indicating a third query associated with the third answer based on the third input in the natural language format; and present the third query in the natural language format on the user device via the graphical user interface for use in resolving the second issue with the service.

18. The non-transitory computer-readable medium of claim 17, wherein the program code is further executable by the processing device for causing the processing device to:

prompt, via the graphical user interface, a user to input a rating for the second answer to the second query or for the third query associated with the third answer;

receive, via the graphical user interface, the rating for the second answer to the second query or for the third query associated with the third answer; and train the machine learning model using the rating by weighting the second answer or the third query in a training dataset based on the rating.

19. The non-transitory computer-readable medium of claim 16, wherein the program code is further executable by the processing device for causing the processing device to:

determine an amount of time involved in resolving the second issue; and train the machine learning model using the second answer to the second query and the amount of time involved in resolving the second issue.

* * * * *